UNITED STATES PATENT OFFICE 2,491,437

DRILLING MUD

Holloway W. Perkins, Beaumont, Tex., assignor to Sun Oil Company, Philadelphia, Pa., a corporation of New Jersey No Drawing. Application August 3, 1948, Serial No. 42,336

6 Claims. (Cl. 252—8.5)

This invention relates to aqueous drilling mud compositions of the type comprising an alkaline earth metal clay, such as a calcium clay, and to a method of treating such muds to improve stability characteristics under well conditions.

Aqueous drilling muds employed in the rotary drilling of wells may be regarded in general as constituting two types dependent upon the chemical form of the hydratable clay present in the mud, namely, alkali metal base muds and alkaline earth metal base muds. In the first mentioned type the clay is usually predominantly in the form of a sodium clay, for example, sodium bentonite; while in alkaline earth metal base muds the clay is usually predominantly in the calcium form. The latter type is often referred to as a lime base mud, since the mud is usually prepared by conversion of a sodium base mud to the calcium form by means of lime.

It is general practice in the earlier stages of a well drilling operation to employ a sodium base mud. In many cases, however, as the drilling proceeds conditions may be encountered which tend to cause excessive increases in viscosity and gel properties and it may become desirable to convert the mud to the calcium form. For example, when the drilling mud is subject to contamination by calcium salts, as when drilling through anhydrite or gypsum or in drilling out a cement plug, difficulty will be experienced in effecting proper control of the viscosity and gel properties of a sodium base mud. In such cases it often will be advantageous to convert the mud to the calcium form so as to render the mud less susceptible to changes in properties upon contamination with the calcium compounds encountered. Also, when a mud of high density is required, it is advantageous to employ a calcium base mud since sodium base mud generally will have an excessively high viscosity at high solids content.

Upon treating a sodium base mud with lime or other calcium compounds to convert it to the calcium form, there is initially a sharp increase in the viscosity of the mud and the viscosity continues to increase as the lime is added until a maximum is reached, after which further additions of lime cause the viscosity to decrease usually to a value below the original viscosity of the mud. The amount of increase in viscosity during the treatment depends upon several factors and especially upon the solids content of the mud. In field practice the conversion of a mud from the sodium to the calcium form has at times entailed considerable difficulties due to excessive increase in viscosity during the conversion and in some cases has caused interruption of the normal drilling operation resulting in loss of time and increased expense.

A more recent development in the preparation of calcium or other alkaline earth metal base muds, which has avoided disadvantages of prior methods and resulted in a drilling fluid of enhanced properties, comprises the incorporation of a lignosulfonate in the mud as a dispersing agent. This improvement in the drilling mud art is described and claimed in a patent application of William E. Barnes, Serial No. 760,507, filed July 11, 1947. The lignosulfonate material employed as dispersing agent can be an alkaline earth metal lignosulfonate or an alkali metal lignosulfonate or both. Such material is available commercially generally in the form of calcium lignosulfonate which is derived from waste sulfite liquor obtained from the sulfite process of paper manufacture. One method practiced commercially for obtaining the lignosulfonate is the so-called Howard process, which is described in Reissue Patent No. 18,268, date December 1, 1931, and also in an article appearing in "Industrial and Engineering Chemistry," volume 31, No. 11, November 1939, pages 1331–1335. The commercial product is obtained in the form of an amorphous solid composed mainly of calcium lignosulfonate but generally also containing of the order of 15–20% carbohydrates.

In preparing a calcium base mud using a lignosulfonate according to the aforesaid improvement, a sodium base drilling mud is treated both with lime and with the lignosulfonate material. The amount of each of these materials used will vary but generally will be within the range of 1–10 lbs./bbl. of drilling mud. The pH value of the mud should be regulated to above 8 and preferably to within the range of 10–13 by the addition of caustic soda if necessary. The use of the lignosulfonate maintains the viscosity and gel strengths of the mud at low values and usually improves the sealing characteristics. It renders the mud especially suitable for use under conditions normally considered adverse, such as in drilling gypsum, anhydrite or cement plugs or when salt water flows are encountered. When the amount of lime added to the mud is in excess of that required to convert the clay to the calcium form, the mud composition is particularly suited for use in drilling through heaving shale formations and has been found to prevent or minimize sloughing of such formations into the borehole.

In the course of drilling a well with the above described lignosulfonate-containing calcium base mud, the mud will usually have properties which are relatively stable. In other words, the viscosity, gel strengths and water losses generally will not be subject to excessive increases while the drilling operation is being conducted. It has now been found, however, that in cases where the drilling is discontinued for a prolonged period of time, the viscosity and gel strengths of the quiescent drilling mud which is allowed to stand in the borehole are apt to increase and may increase even to such extent that the mud will no longer be pumpable. Considerable difficulty will then be encountered in case it is desired to resume drilling. The reason why such excessive increase in viscosity and gelation may take place when the mud is allowed to stand quiescent under well conditions is not definitely known but it apparently occurs because of a loss of the dispersing ability of the lignosulfonate, which permits the clay particles to agglomerate.

I have now found that the increase in viscosity and gel strengths of the above described type of mud composition during the time when drilling is suspended can be minimized or substantially prevented by adding quebracho to the mud prior to discontinuing the drilling operation. The improved stability resulting from the addition of quebracho does not appear to occur because of any dispersing action the quebracho itself may have on the clay particles but rather because it evidently inhibits the loss of the dispersing ability of the lignosulfonate material. This is shown by the fact that when quebracho alone is added, not only is there a failure to prevent increase in viscosity and gelation of the mud upon standing under well conditions but such increase appears to be accelerated. In other words, quebracho alone has an adverse effect upon the stability of the drilling mud, while quebracho in combination with the lignosulfonate has a distinct stabilizing effect. This is illustrated by the examples hereinafter described.

The quebracho should be added to the lignosulfonate-containing mud in sufficient amount to prevent excessive increase in viscosity and gelation of the mud during the time when it is permitted to stand quiescent within the borehole. The amount, of course, may vary to an extent with the particular mud concerned, the well conditions and the length of time that the drilling operation is to be suspended. As a general rule, the quebracho should be added at least in excess of 0.5 lb./bbl. of drilling mud and usually in a proportion within the range of ¾–3 lbs./bbl.

*Example 1*

A lignosulfonate-containing calcium base mud was prepared from a natural clay mud of the sodium type by treating the same with 3.5 lbs./bbl. of calcium lignosulfonate and 3 lbs./bbl. of lime and adding to the composition 1 lb./bbl. of caustic to adjust the pH value to above 10. The resulting composition was placed in a bomb where it was subjected to a pressure of 500 lbs./sq. in. ga. and a temperature of 200–220° F. to simulate well conditions. After standing under such conditions for 24 hours, the mud was removed and tested. Results were as follows:

|  | Before heating in bomb | After heating for 24 hrs. |
|---|---|---|
| Stormer viscosity, cp | 22 | 110 |
| Instantaneous gel, g | 0 | 150 |
| 10-minute gel, g | 30 | 220 |
| Water loss, c. c | 12½ | 17½ |
| Cake thickness, in | 5/32 | 5/32 |

These results show that subjecting the drilling mud composition to simulated well conditions caused a large increase in viscosity and gelation characteristics.

*Example 2*

Another sample of lignosulfonate-containing mud prepared in the same manner as described in the preceding example was treated with 1 lb./bbl. of quebracho and the resulting composition was subjected to heat and pressure treatment under the conditions described in Example 1 except that the time of heating was 48 hours. The following results were obtained:

|  | Before heating in bomb | After heating for 48 hrs. |
|---|---|---|
| Stormer viscosity, cp | 10 | 21 |
| Instantaneous gel, g | 0 | 1 |
| 10-minute gel, g | 25 | 35 |
| Water loss, c. c | 9 | 14½ |
| Cake thickness, in | 3/32 | 3/32 |

Comparison of these results with those of the preceding example show that the addition of quebracho was quite effective in preventing excessive increase in viscosity and gelation.

*Example 3*

This example was carried out in the same manner as Example 2 except that 2 lbs./bbl. of quebracho was used.

|  | Before heating in bomb | After heating for 48 hrs. |
|---|---|---|
| Stormer viscosity, cp | 10 | 26 |
| Instantaneous gel, g | 0 | 0 |
| 10-minute gel, g | 20 | 20 |
| Water loss, c. c | 9½ | 14 |
| Cake thickness, in | 3/32 | 3/32 |

*Example 4*

This example illustrates the adverse effect of quebracho in the absence of a lignosulfonate. A sample of the same natural sodium base mud referred to in Example 1 was converted substantially to a calcium base by treatment with 2 lbs./bbl. of lime. Also, caustic soda was added in the same proportion. Then, 2 lbs./bbl. of quebracho was added and the resulting composition was subject to pressure and temperature conditions as in Example 1 for a time of 24 hours.

|  | Before heating for 24 hrs. | After heating for 24 hrs. |
|---|---|---|
| Stormer viscosity, cp | 6 | (Too Thick) 500 |
| Instantaneous gel, g | 0 |  |
| 10-minute gel, g | 40 |  |
| Water loss, c. c | 11½ | 22½ |
| Cake thickness, in | 3/32 |  |

A comparison of these results with those in Example 1 show that, in the absence of the lignosulfonate, not only does the quebracho fail to inhibit excessive gelation and viscosity increase but its presence evidently promotes instability of the mud upon standing for a time under simulated well conditions.

Having described my invention, what I claim and desire to protect by Letters Patent is:

1. An aqueous drilling mud comprising a hydratable alkaline earth metal clay, at least 1 lb./bbl. of a material derived from waste sulfite liquor as an amorphous solid and composed mainly of a lignosulfonate selected from the group consisting of alkali metal lignosulfonates and alkaline earth metal lignosulfonates, and quebracho in amount exceeding 0.5 lb./bbl. sufficient to prevent excessive increase in viscosity and gelation when the drilling mud is permitted to stand quiescent under well conditions.

2. A drilling mud according to claim 1 containing 1–10 lbs./bbl. of the said material and ¾–3 lbs./bbl. of quebracho.

3. An aqueous drilling mud comprising a hydratable calcium clay, at least 1 lb./bbl. of a material derived from waste sulfite liquor as an amorphous solid and composed mainly of calcium lignosulfonate, and quebracho in amount exceeding 0.5 lb./bbl. amount to prevent excessive increase in viscosity and gelation when the drilling mud is permitted to stand quiescent under well conditions.

4. A drilling mud according to claim 3 containing 1–10 lbs./bbl. of the said material and ¾–3 lbs./bbl. of quebracho.

5. In a well drilling operation wherein a drilling mud comprising a hydratable alkaline earth metal clay and a material derived from waste sulfite liquor as an amorphous solid and composed mainly of a lignosulfonate selected from the group consisting of alkali metal lignosulfonates and alkaline earth metal lignosulfonates is circulated through the borehole during drilling and wherein the drilling is discontinued for a time and subsequently resumed, the method of preventing excessive increase in viscosity and gelation of the drilling mud during the time when circulation through the borehole is discontinued which comprises adding to said drilling mud, prior to such discontinuance of circulation, quebracho in excess of 0.5 lb./bbl.

6. Method according to claim 5 wherein the said material is composed mainly of calcium lignosulfonate and the quebracho is added in a proportion of ¾–3 lbs./bbl.

HOLLOWAY W. PERKINS.

REFERENCES CITED

The following references are of record in the file of this patent:

UNITED STATES PATENTS

| Number | Name | Date |
|---|---|---|
| 1,847,864 | Cross | Mar. 1, 1932 |
| 1,999,766 | Lawton et al. | Apr. 30, 1935 |
| 2,109,858 | Cannon | Mar. 1, 1938 |
| 2,213,039 | David | Aug. 27, 1940 |
| 2,375,616 | Booth | May 8, 1945 |
| 2,450,936 | Cardwell | Oct. 12, 1948 |

OTHER REFERENCES

Lawton et al.: Chemical Treatment of Rotary Drilling Fluids, articles in Physics, vol. 2, pages 365–375, May 1932, and vol. 3, pages 185–192, October 1932.

Wallace: Drilling Mud Control in the Gulf Coast Area, article in The Petroleum Engineer, January 1946, pages 196, 198, 200 and 202.

Cannon: Drilling-Mud Control, article in The Oil and Gas Journal, May 3, 1947, pages 101, 102, and 103.

Salvesen et al.: Dispersants from Sulfite Liquor, article in Chemical Industries, August 1947, 3 pages.